United States Patent [19]

Carr et al.

[11] 4,214,772
[45] Jul. 29, 1980

[54] LATERALLY ADJUSTABLE TRAILER HITCH SYSTEM

[76] Inventors: Herbert F. Carr, 515 Pine Ave.; Robert W. Cooper, Marley Mill Rd., both of Ozark, Ala. 36360

[21] Appl. No.: 928,755

[22] Filed: Jul. 27, 1978

Related U.S. Application Data

[63] Continuation-in-part of Ser. No. 880,526, Feb. 23, 1978, abandoned.

[51] Int. Cl.² .............................................. B60D 1/06
[52] U.S. Cl. ................................. 280/415 A; 280/470
[58] Field of Search ........... 280/415 R, 415 A, 490 R, 280/470, 469, 468, 467; 293/117, 118, 119

[56] References Cited

U.S. PATENT DOCUMENTS

| 1,662,946 | 12/1915 | Olson | 280/470 |
|---|---|---|---|
| 1,794,532 | 3/1931 | Nenna | 293/117 |
| 2,911,233 | 11/1959 | Riddle | 280/415 A |
| 2,917,323 | 12/1959 | Mandekic | 280/470 |
| 3,700,263 | 10/1972 | Day | 280/415 A |
| 3,837,674 | 9/1974 | Rathsack | 280/415 A |
| 3,891,239 | 6/1975 | Leo | 280/490 |

FOREIGN PATENT DOCUMENTS

435178  6/1934  United Kingdom ..................... 280/470

*Primary Examiner*—John J. Love
*Assistant Examiner*—Randall A. Schrecengost
*Attorney, Agent, or Firm*—Griffin, Branigan & Butler

[57] ABSTRACT

A trailer hitch system (10) having longitudinal hitch ball movement whereby a trailer tow point can be laterally adjusted. The longitudinal hitch ball movement is facilitated by a screw shaft (20) housed in the trailer hitch system (10) and readily accessible from either side of the trailer hitch system (10). The trailer hitch system (10) may accommodate multiple hitch balls (22, 23) and allows any one of the hitch balls (22, 23) to be selectively centered on a bumper (82) of a towing vehicle. Hitch balls (22, 23) of diverse sizes may be interchanged while the trailer hitch system (10) is installed on the towing vehicle. The trailer hitch system (10) may be adapted to any type of towing vehicle. An adaptor (110) allows attachment of other types of hitches which are also laterally adjustable therewith.

17 Claims, 11 Drawing Figures

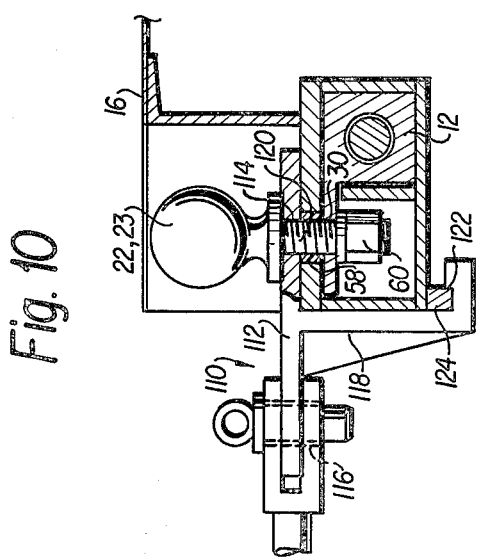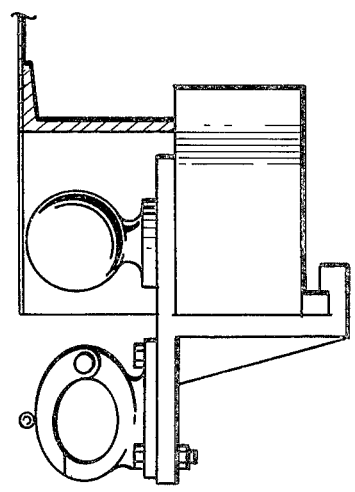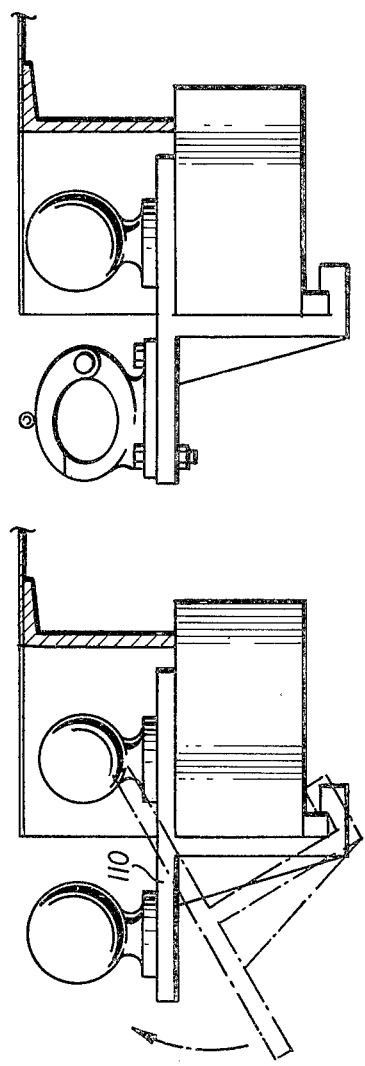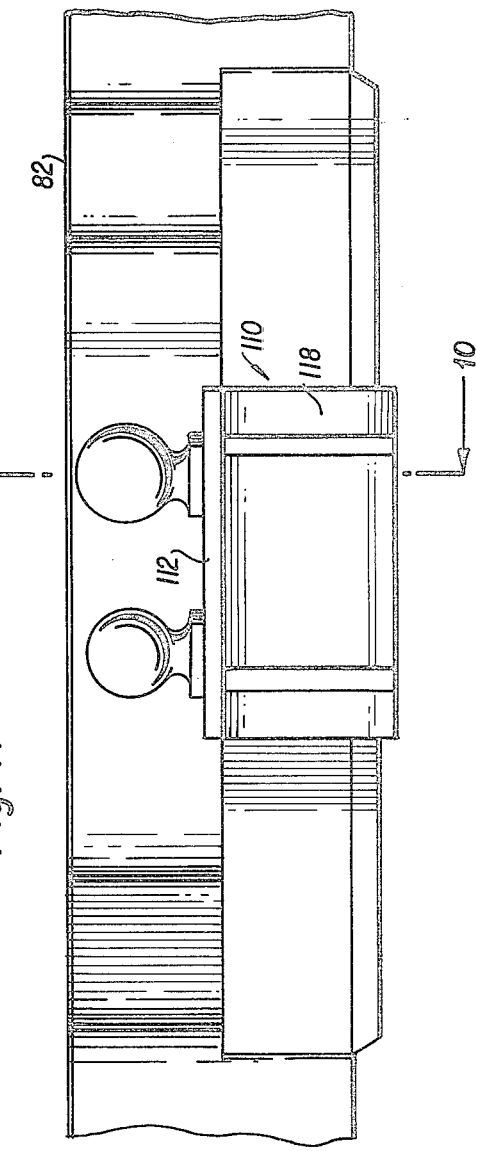

LATERALLY ADJUSTABLE TRAILER HITCH SYSTEM

This is a continuation-in-part of application Ser. No. 880,526 filed Feb. 23, 1978 and now abandoned.

BACKGROUND OF THE INVENTION

The market is replete with trailer and hitching devices for coupling vehicles. However, the trailer and hitching devices currently available do not adjust a plurality of coupling elements, such as hitch balls, through a continuum of lateral positions. The above deficiency is especially egregious when considering bumpers equipped with trailer hitches having more than one hitch ball. Specifically, multiple stationary hitch balls necessitate that one or more hitch balls be off-center relative to the bumper of the towing vehicle. Thus, multiple stationary hitch balls may preclude positioning the tow point at the bumper center, resulting in weaving or swaying of the towed vehicle.

An off-center tow position, whether on multi or single hitch-ball systems, precipitates additional problems. For example, it increases tire-to-road surface scuffing caused by side pull. Further, portions of the towed vehicle may hazardously protrude across a highway center line or the trailer wheels may be shouldered on the side of the roadway. Moreover, the coupling process may be cumbersome if not dangerous.

In view of the above problems, an object of this invention is to provide a laterally adjustable trailer hitch system whereby a trailer tow point can be laterally adjusted through a continuum of lateral positions.

Another object of this invention is to provide a laterally adjustable hitch ball system having multiple hitch balls and a means for efficiently interchanging or substituting hitch balls.

A further object of this invention is to provide a laterally adjustable trailer hitch system for improving towing safety by reducing protrusion of the trailer over the roadway center line and roadway shouldering of the trailer wheels.

Another object of this invention is to provide a laterally adjustable trailer hitch system having a means of laterally positioning the hitch ball during the hook-up process so that the hitch ball coincides with the trailer-tongue hitch, thus avoiding the necessity of manually lifting and shifting the trailer tongue to a coupling position.

Another object of this invention is to provide a laterally adjustable trailer hitch system facilitating the safe and expedient alignment of towed vehicles with a parking pad as required in the parking of mobile homes, travel trailers, and the like.

Another object of this invention is to provide a laterally adjustable trailer hitch system facilitating the positioning, mating, and assembly of double-wide mobile-home component units.

Still another object of this invention is to provide a laterally adjustable trailer hitch system facilitating, by lateral adjustment of the hitch ball, a safe and expedient hook-up of the towing vehicle to the trailer when the angle of accessibility departs from the longitudinal axis of the towing vehicle.

SUMMARY OF THE INVENTION

The present invention concerns trailer hitch systems for towing vehicles and provides a laterally adjustable trailer hitch system for adjusting trailer coupling elements, such as hitch balls, along a continuum of lateral positions. The lateral adjustment capability facilitates selective centering of the trailer coupling elements, and thus a tow point, with respect to the bumper of the towing vehicle when so required for towing purposes. On the other hand, the lateral adjustment capability allows off-center manuvering for hook-up and disengagement of the towed vehicle.

The lateral adjustment is accomplished by a driven screw arrangement housed in the trailer hitch system and readily accessible for driving purposes from either side thereof. Multiple trailer hitch balls are mounted on a carriage means which is, in turn, engaged to the screw arrangement so that the hitch balls are longitudinally displaced along a defined continuum of positions as the screw is rotationally driven. Thus, the laterally adjustable trailer hitch system allows any one of the hitch balls to be selectively centered on the bumper of the towing vehicle.

Hitch balls of diverse sizes may be interchanged while the trailer hitch system is installed on the towing vehicle. Specifically, a hitchball may be inserted into or extracted from the trailer hitch system by respectively affixing or removing a nut attached to the hitch ball. The nut is accessible through an aperture on the underside of the trailer hitch system.

The trailer hitch system may be adapted to any type of towing vehicle by using either a specially constructed durable bumper or the original vehicle bumper in conjunction with suspension straps and plates.

BRIEF DESCRIPTION OF THE DRAWINGS

The foregoing and other objects, features, and advantages of the invention will be apparent from the following more particular description of preferred embodiments as illustrated in the accompanying drawings in which like referenced characters refer to the same parts throughout the various views. The drawings are not necessarily to scale, emphasis instead being placed upon illustrating the principles of the invention.

FIGS. 8 and 9 are side views of second and third embellished embodiments of trailer hitch systems of this invention.

FIGS. 10 and 11 are respectively sectional side views of a fourth embellished embodiment of this invention, with FIG. 10 being taken on line 10—10 of FIG. 11.

Figure 5:
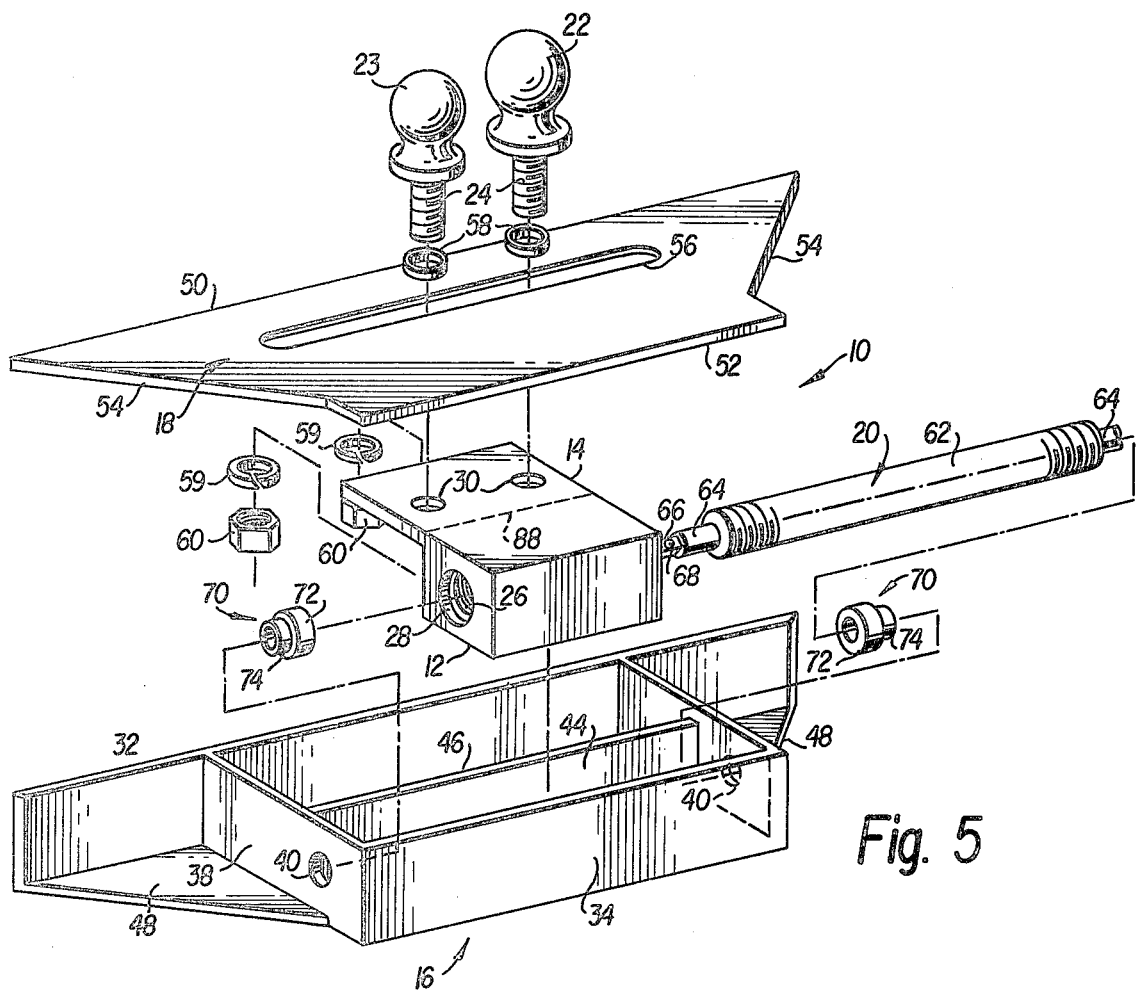
FIG. 5 is an exploded perspective view of the structure illustrated in FIG. 2.

The general structural features are best seen in FIG. 5. A laterally adjustable trailer hitch system 10 comprises a carriage means, such as screw-block 12 and ball retaining plate 14 attached thereto. The carriage means is inserted into a main frame member formed, for example, by covering a bottom housing assembly 16 with a top housing plate 18. A drive means, such as adjusting screw 20, extends through the carriage means and protrudes through the main frame member. Trailer coupling elements, such as hitch balls 22 and 23, are mounted on hitch-ball shanks 24 and emerge from the laterally adjustable trailer hitch system 10 through the top housing plate 18 and the ball retaining plate 14. The assembly procedure is subsequently detailed.

The rectangular screw-block 12 has a circular threaded portion 26 extending therethrough with counter bores 28 at the extremes of the threaded portion 26 adjacent each edge of the screw-block 12. The threaded portion 26 and counter bores 28 of the screw-block 12 receive the adjusting screw 20.

Welded to the screw-block 12 is the thin, rectangular ball retaining plate 14. Holes 30 are drilled through the ball retaining plate 14 to accommodate the hitch-ball shanks 24. In this respect, although the drawings exhibit ball retaining plate 14 with only two holes 30, additional holes can be drilled to correspond with the number of hitch balls to be incorporated into the system.

The bottom housing assembly 16 contains a unit comprising the screw-block 12, the adjusting screw 20, and the ball retaining plate 14. The bottom housing assembly has a front wall 32, a back wall 34, a floor 36, and side walls 38 which have holes 40 to accommodate the adjusting screw 20.

Figure 1:
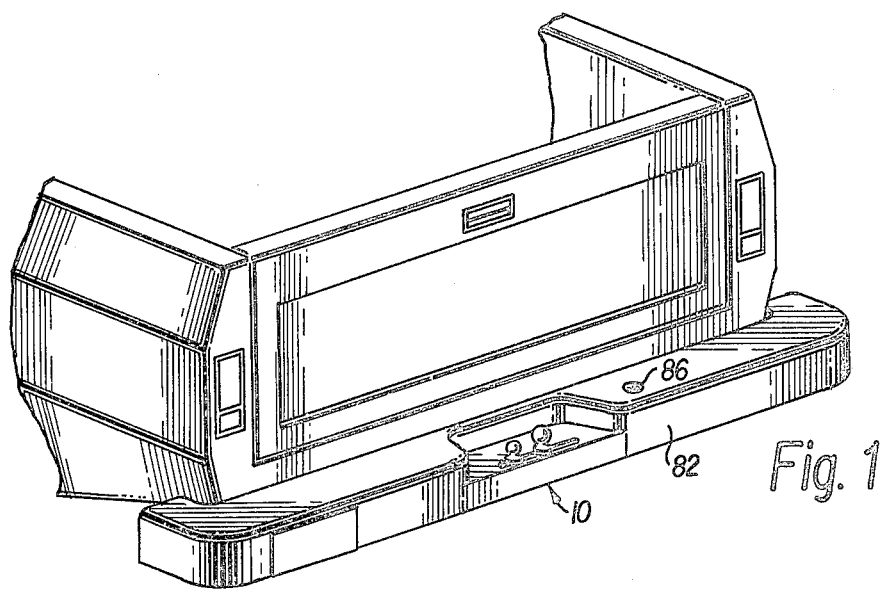
FIG. 1 is a perspective view of the front of the laterally adjustable trailer hitch system when mounted on a bumper and seen from the rear of the towing vehicle.
Figure 2:
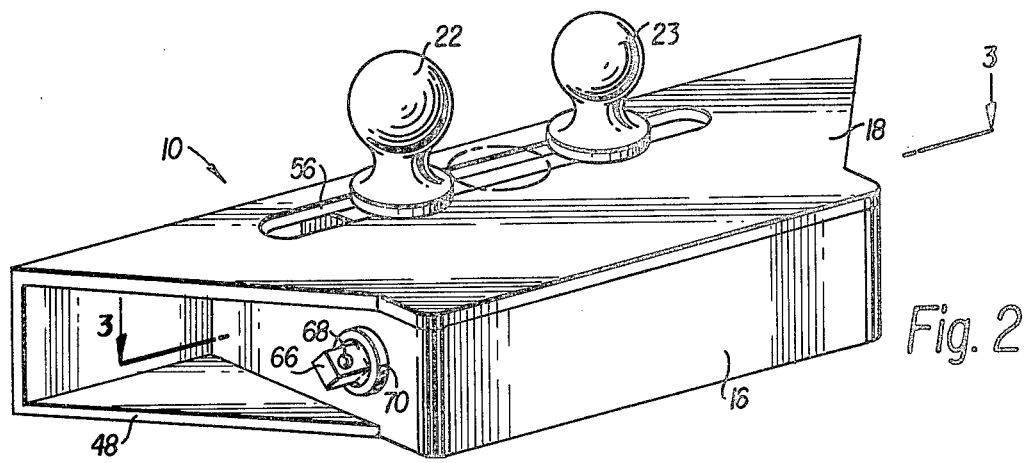
FIG. 2 is a perspective view of the back of the laterally adjustable trailer hitch system.
Figure 6:
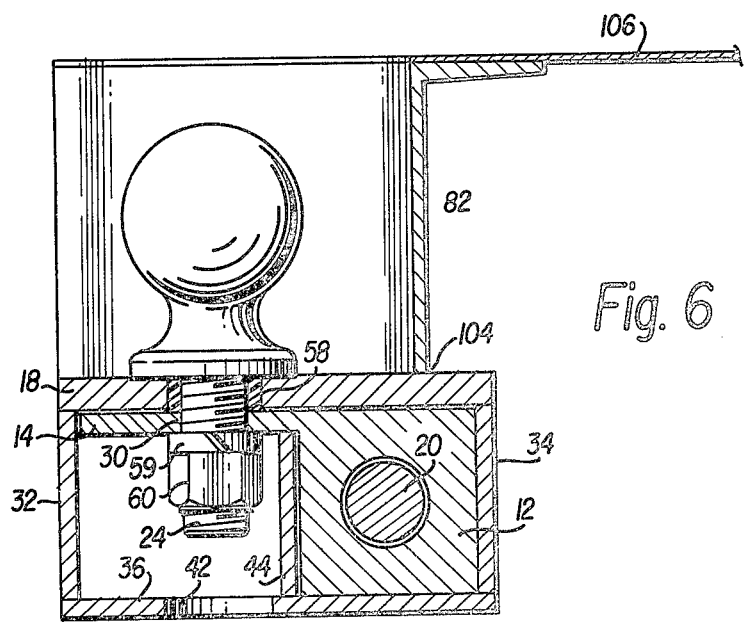
FIG. 6 is a side view of FIG. 3 taken along line 6—6 thereof.
Figure 3:
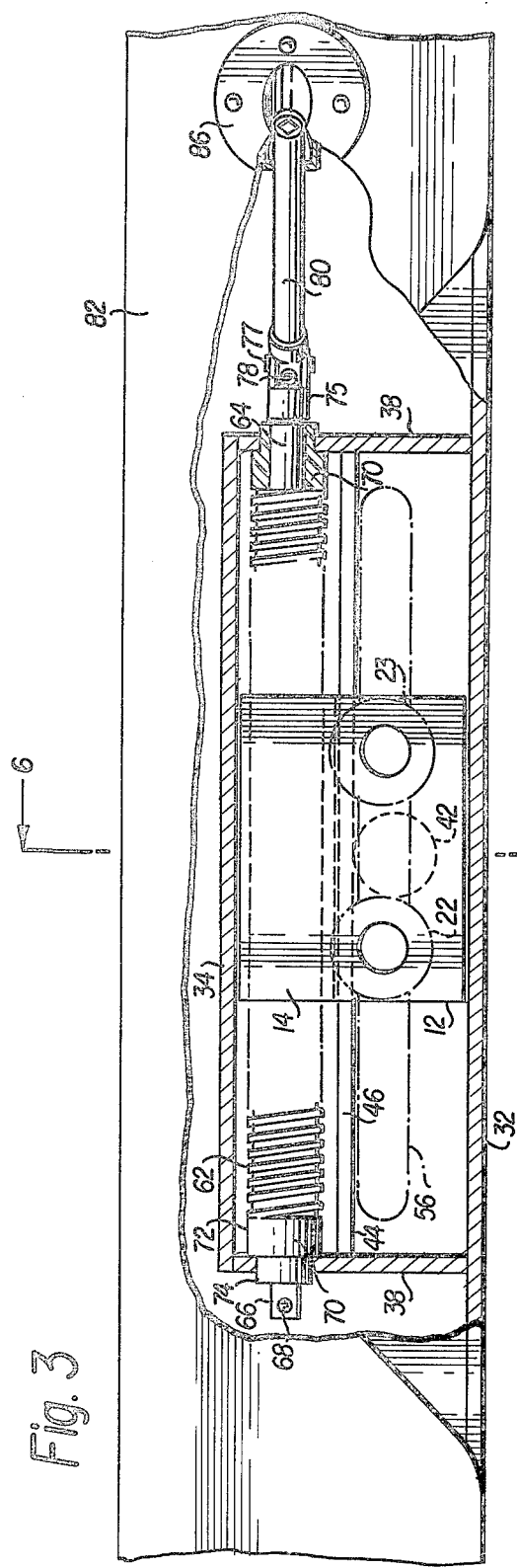
FIG. 3 is a top view of FIG. 2 taken along line 3—3 thereof showing the trailer hitch system mounted on a bumper and a driving means for laterally adjusting the positions of the hitch balls.
Figure 4:
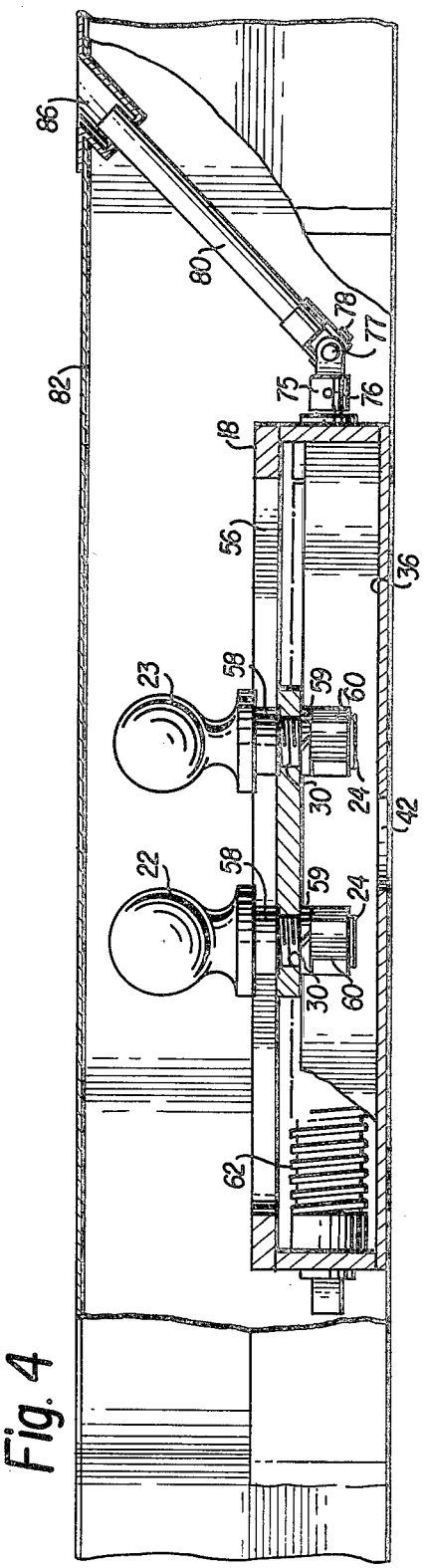
FIG. 4 is a partially broken-away front view of the structure illustrated in FIG. 3.

As seen in FIGS. 3, 4 and 6, the floor 36 has an installation access hole 42 used when interchanging or substituting hitch balls. Welded to the floor 36 and the side walls 38 is a screw-block guide strip 44 which retains the screw-block 12 in the rearward portion of the bottom housing assembly 16, thus defining a track. The screw-block guide strip 44 does not extend the full height of the side walls 38. The ball retaining plate 14 fits over a contacting surface 46 and protrudes into the frontward portion of the bottom housing assembly 16. Since the front wall 32 is longer than the back wall 34, the floor 36 tapers by wings 48 on each side of the bottom housing assembly 16.

Welded to the top of the bottom housing assembly 16 is the top housing plate 18. Top housing plate 18 as a front edge 50, a back edge 52, and side edges 54 (see FIG. 5). Toward the front edge 50 of the top housing plate 18 is a hitch-ball traversing slot 56 which defines the possible lateral motion of the hitch balls. The hitch-ball shanks 24 on which hitch balls 22 and 23 are mounted extend through both the hitch-ball traversing slot 56 and the holes 30 of the ball retaining plate 14. Spacer 58 fits over the hitch-ball shank 24 immediately beneath the hitch ball 22 for guidance through the hitch-ball traversing slot 56 and holes 30. Washer 59 then fits over shank 24 before a hitch-ball shaft nut 60 screws onto shank 24 to affix hitch balls 22 within the system.

The adjusting screw 20 comprises a centrally threaded portion 62, two screw collars 64, and two square driven members 66 (see FIG. 5). Screw collars 64, located near each end of adjusting screw 20, are immediately adjacent the centrally threaded portion 62 and between portion 62 and square driven members 66, but are of smaller radius than portion 62. The square driven members 66 contain pin holes 68 used in coupling the hitch ball adjusting screw to a driving means. Two screw-shaft bushings 70 fit over the screw collars 64 of the adjusting screw 20. The bushings 70 comprise a larger radial portion 72 and a smaller radial portion 74.

Referring to FIGS. 3 and 4, square driven members 66 of the adjusting screw 20 are selectively coupled to a universal drive joint 75 by means of a coupling pin 76 which is inserted through pin holes 68. The universal drive joint 75 may pivot about pin 77 or pin 78 and is connected to an extension 80.

To guide the extension 80 through bumper 82, a fitting, such as drive extension sleeve 86, is first inserted into the bumper 82. FIGS. 3 and 4 illustrate insertion of the extension 80 through the extension sleeve 86 for union with the universal joint 75. In this respect, a drive handle (not shown) may be attached to the extension 80.

To assemble the system 10, the ball retaining plate 14 is welded onto the screw-block 12 along weld lines 88 (see FIG. 5). The adjusting screw 20 is inserted into the threaded portion 26 of the screw-block 12 so that both ends of the adjusting screw 20 protrude from the screw-block 12. The screw-shaft bushings 70 are then mounted on the screw collars 64 of the adjusting screw 20 so that square driven members 66 extend through the bushings 70.

The bottom housing assembly 16 is formed by welding to the floor 36, the front wall 32, the back wall 34, and the screw-block guide strip 44. The screw-block 12, the ball retaining plate 14, and the adjusting screw 20 are then inserted as one unit into the bottom housing assembly 16 before the side walls 38 are welded onto the bottom housing assembly 16.

The side walls 38 are welded onto the bottom housing 16 such that the smaller diameter portion 74 of the screw-shaft bushing 70 extends through holes 40 of the side walls 38, as do portions of the screw collars 64 and the entire square driven members 66 of the adjusting screw 20. The larger diameter portions 72 of the screw shaft bushing 70 have larger diameters than the holes 40, thus permanently retaining the centrally threaded portion 62 of the adjusting screw 20 within the bottom housing assembly 16. The top housing plate 18 is then placed over the bottom housing assembly 16 and welded around the entire periphery.

Regarding assembly of the hitch balls, the ball shank spacer 58 is mounted on the hitch-ball shank 24 which is then inserted through the hitch-ball traversing slot 56 and through the appropriate hole 30 in the ball retaining plate 14. By driving the adjusting screw 20 as hereinafter described, the hitch-ball shank 24 can be centered above the installation access hole 42 through which a washer 59 and a hitch-ball shaft nut 60 can be mounted on the hitch-ball shank 24. This procedure is repeated for each of the hitch balls to be incorporated into the multi-hitch system, but using a specific hole 30 in retaining plate 14 for each.

Figure 7:
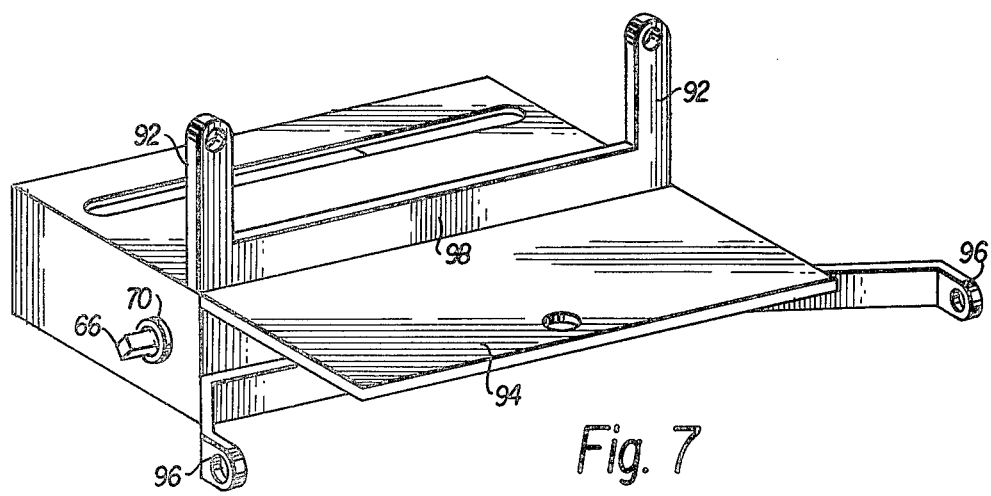
FIG. 7 is a back view of the laterally adjustable trailer hitch system showing plates and straps for mounting the illustrated structure on a conventional bumper.

The laterally adjustable trailer hitch system 10 may be mounted on any type towing vehicle. Considering first passenger cars and station wagons, the unit can be suspended under the original bumper. In this respect, FIG. 7 illustrates a means for attaching the trailer hitch system to the passenger vehicle. That is, lateral anchor straps 92 are affixed to bumper attachment bolts (not shown); a longitudinal anchor plate 94 connects to a vehicle frame cross member (not shown); and, angular anchor straps 96 are affixed to the vehicle side frame at bumper attachment arms (not shown). The lateral anchor straps 92, angular anchor straps 96, and longitudinal anchor plate 94 are preformed to fit the specific vehicle. As seen in FIG. 7 the longitudinal anchor plate 94 is welded to the trailer hitch system along line 98. The lateral anchor straps 92 and the angular anchor straps 96 are also welded to the trailer hitch system.

Considering next the installation of the laterally adjustable trailer hitch system on towing vehicles such as pick-up trucks and motor homes, there may be a preference to discard the original bumper on those vehicles and to replace it with a stronger and more durable bumper such as those constructed from stock steel or preformed steelplate. All figures illustrate the durable bumper designated 82. FIG. 6 best displays the bumper 82 as well as lines 104 along which the bumper 82 is welded to the trailer hitch system. A top skirt plate 106, preferably formed of about 12 gauge steel, fits over the bumper 82. Means for fastening the bumper 82 to the vehicle body are not shown.

In case the owner of a pickup truck or motor home desires to retain the original bumper and not to replace it as suggested above, the laterally adjustable trailer hitch system may be suspended from the original bumper arms and frame as first above discussed in reference to passenger cars and station wagons.

The lateral adjustment of the laterally adjustable trailer hitch system 10 is achieved by attaching the universal drive joint 75 to the square driven member 66 of the hitch ball adjusting screw 20 by means of coupling pin 76 (see FIGS. 3 and 4). The attachment may be made at either end of the adjusting screw 20. The universal drive joint 75 is connected to extension 80 which is in turn connected to a drive handle (not shown). By rotating the driven handle the rotational movement is imparted first to the extension 80 and then to the universal drive joint 75 which is coupled by the coupling pin 76 to the adjusting screw 20. The rotation of the adjusting screw 20 causes the screw-block 12, the ball retaining plate 14, and the hitch ball 22 mounted thereon to traverse the lateral path defined by the hitch-ball traversing slot 56. In this manner, any one of the multiple hitch balls 22 can be positioned at the center of the bumper of the towing vehicle or at any other desired position.

The laterally adjustable trailer hitch system 10 is designed to accommodate installation of all size hitch balls presently available. The hitch balls may be interchanged by positioning the appropriate hitch ball shank 24 over the installation access hole 42. The hitch-ball shaft nut 60 and washer 59 may be removed through the installation access hole 42 by means of a socket wrench, thus enabling the hitch ball 22 to be extracted from above the laterally adjustable trailer hitch system 10. In the same manner, a different size hitch ball seated on a spacer 58 may be inserted through the hitch-ball traversing slot 56 and the appropriate hole 30 of the ball retaining plate 14 so that a hitch-ball shaft nut 60 and washer 59 may be mounted and fastened thereon through the installation access hole 42.

With reference to FIGS. 8–11, an embellishment of the trailer hitch system 10 is an adaptor 110 which is mountable on, and movable with, the ball adjusting screw block 12. In this respect, the adaptor 110 comprises a horizontal plate 112 having mounting apertures 114 and hitch aperture 116 therein and a stabilizing wing or arm 118. The adaptor 110 is mounted to the ball adjusting screw block 12 by means of hitch-ball threaded shafts 120 and nuts 60 as are described above. In this regard, the horizontal plate 112 is clamped between the spacers 58 and the hitch balls 22 and 23 by the nuts 60.

The stabilizing wing 118 includes a stabilizing surface 122 which extends behind an element of the housing assembly 16 such that the stabilizing surface 122 can move along the element of the housing, but yet when an upward force is applied at the hitch aperture 116 the stabilizing surface 122 engages the frame element and thereby prevents the adaptor 110 from rotating. In the illustrated embodiment, the frame element is a bar 124 that is welded to the housing 16 which was fully described above.

FIG. 8 depicts the adaptor as it is used to attach an unusually large trailer hitch ball. FIG. 9 depicts the adaptor as used to mount a pintle hook which is primarily used for farm and industrial tow purposes. FIG. 10 depicts the adaptor as used to mount a forked tongue which is also primarily used for farm and industrial tow purposes. Since there are two primary hitch balls 22 and 23 whose threaded shafts and nuts mount the horizontal plate 112 to the ball adjusting screw block 10, the adaptor 110 is rather secure. The stabilizing wing 118 and the stabilizing surface 122 enhance such stability. In addition, however, the adaptor 110 is freely laterally adjustable as is the previously described embodiment of the invention.

In operation, when one desires to use the adaptor 110, he simply removes the hitch balls 22 and 23 from the ball adjusting screw block 12 by loosening the hitch ball shaft nut 60. He then rotates the adaptor 110 counterclockwise as viewed in the drawings and engages the stabilizing surface 122 behind the bar 124 of the frame. Thereafter, he rotates the adaptor 110 in a clockwise direction until mounting apertures 114 therein line up with ball retaining plate holes 30 in the block 12. Threaded shafts 120 of the hitch balls 22 and 23 are inserted through the respective apertures and the nuts 60 are tightened to clamp the horizontal plate 112 between the hitch balls 22 and 23 and the spacers 58.

While the invention has been particularly shown and described with reference to preferred embodiments thereof, it will be understood by those skilled in the art that various alterations in form and detail may be made therein, without departing from the spirit and scope of the invention.

We claim:

1. A vehicular hitch mounted on a towing vehicle comprising:
    a trailer coupling element for selectively engaging and disengaging companion coupling elements on towed vehicles;
    a main frame member for mounting and securing said vehicular hitch to the towing vehicle, said main frame member comprising end walls, a front wall, and a back wall, all of which extend substantially from a bottom plate to a top plate of said main frame member, said top plate having an aperture therein to accommodate said trailer coupling element;
    a fixed guide member mounted within said main frame member intermediate said front and back walls, thereby defining a rearward track region between said back wall and said guide member and a frontward track region between said front wall and said guide member, said guide member extending from said bottom plate to near said top plate, thereby defining a gap between said guide member and said top plate;
    carriage means contained within said rearward track region of said main frame member, said carriage means also having a flat plate affixed thereto, said flat plate extending approximately horizontally, when said towing vehicle is on flat pavement, through said gap and over said guide member so that said flat plate protrudes into said frontward track region, said flat plate having a vertical hole to accommodate said trailer coupling element at a vertical orientation perpendicular to said flat plate;

drive means movably mounted on said main frame member within said rearward track region for engaging said carriage means and imparting lateral motion to the carriage means and trailer coupling element mounted thereon, thereby causing the trailer coupling element to be horizontally moved along said main frame member.

2. The vehicular hitch as defined in claim 1 wherein said drive means comprises a screw movably mounted on said main frame and integral with said carriage means; wherein said carriage means comprises a block which engages said screw so that said carriage means may be mounted upon the screw; and, wherein said main frame member end walls have apertures for accommodating said screw.

3. The trailer hitch device as defined in claim 2 wherein said screw comprises square driven members at its ends for coupling said screw to a rotational driving source.

4. The vehicular hitch as defined in claim 3 wherein a crank is attached to the square driven member of the screw for imparting rotational motion, said crank comprising a universal joint, an extension to the universal joint, and a fitting for an aperture in a bumper of a towing vehicle and through which the extension to the universal joint is inserted.

5. The vehicular hitch as defined in claim 1 wherein said drive means is coupled to a crank which imparts rotational motion to said drive means.

6. The vehicular hitch as defined in claim 1, wherein said coupling element includes a coupling element mounting means, said mounting means being substantially contained in said forward track region of said main frame member, and wherein said main frame member has an opening on said bottom plate, said opening permitting access from beneath the vehicular hitch upwardly into said forward track region to the coupling element mounting means substantially contained therein for selective installation or removal of said trailer coupling element.

7. The vehicular hitch as defined in claim 6 wherein the aperture of said top plate of said main frame member is a slot defining the path of lateral travel of the trailer coupling element, and wherein said trailer coupling element includes a spacer element passing through said slot and a shoulder element extending over the top surface of said top plate.

8. The vehicular hitch as defined in claim 6 wherein the aperture of said main frame member top plate is a slot defining the path of lateral travel of the trailer coupling element.

9. The vehicular hitch as defined in claim 1 wherein the aperture of said main frame member top plate is a slot defining the lateral path of the trailer coupling element.

10. The vehicular hitch as defined in claim 1 wherein said coupling element includes a coupling element mounting means, said mounting means being substantially contained in said forward track region of said main frame member, and wherein said main frame member has an opening on said bottom plate, said opening permitting access from beneath the vehicular hitch upwardly into said forward track region to the coupling element mounting means substantially contained therein for selective installation or removal of said trailer coupling element.

11. The vehicular hitch as defined in claim 1 further comprising a plurality of trailer coupling elements mounted on said flat plate of said carriage means.

12. A vehicular hitch as defined in claim 1 wherein said trailer coupling element is a ball-type element and includes a coupling-element mounting means for selectively mounting said ball-type trailer coupling element on said carriage means and dismounting it from said carriage means and wherein is further included an adaptor means which is selectively attachable to, and detachable from said carriage means, to be laterally transported therewith, by said coupling-element mounting means, said adaptor means including an additional trailer coupling element mounted thereon, said adaptor means further including a stabilizing wing which extends rearwardly about a portion of said main frame member for engaging a rearward surface thereof when a lifting force is applied to said additional trailer coupling element.

13. A vehicular hitch as defined in claim 12 wherein said coupling-element mounting means is a threaded shaft and nut.

14. A vehicular hitch as in claim 12 wherein said adaptor means comprises a plate which extends laterally, substantially horizontally when said towing vehicle is on flat pavement, and forwardly from said ball-type trailer coupling element.

15. A vehicular hitch mounted on a towing vehicle comprising:
a main frame member for mounting and securing said vehicular hitch to the towing vehicle;
a ball-type trailer coupling element for selectively engaging and disengaging companion coupling elements on towed vehicles;
carriage means on which said ball-type trailer coupling element is mounted for transporting said trailer coupling element laterally along said main frame member, said ball-type trailer coupling element including a ball-type coupling element mounting means for selectively mounting said ball-type trailer coupling element on said carriage means and dismounting it from said carriage means;
drive means movably mounted on said main frame member for engaging said carriage means and imparting lateral motion to the carriage means and trailer coupling element mounted thereon, thereby causing the trailer coupling element to be horizontally moved along said main frame member; and
an adaptor means which is selectively attachable to and detachable from, said carriage means, to be laterally transported therewith, by said ball-type coupling element mounting means of said ball-type coupling means, said adaptor means including an additional trailer coupling element mounted therein, said adaptor means further including a stabilizing wing which extends rearwardly about an elongated portion of said main frame member for sliding contact therewith when moving laterally with said carriage means, but engaging a rearward surface thereof when a lifting force is applied to said additional trailer coupling element.

16. The vehicular hitch as defined in claim 15 wherein said drive means comprises a screw movably mounted on said main frame and integral with said carriage means; wherein said carriage means comprises a block which engages said screw so that said carriage means may be mounted upon the screw; and, wherein said main frame member comprises end plates having apertures for accommodating said screw.

17. A vehicular hitch as in claim 15 wherein said adaptor means comprises a plate which extends laterally, substantially horizontally, when said towing vehicle is on flat pavement, and forwardly from said ball-type coupling element.

* * * * *